Sept. 27, 1955    R. B. SEYMOUR ET AL    2,718,829
PROTECTIVE SURFACE
Filed Oct. 11, 1952

INVENTOR.
Raymond B. Seymour
Robert H. Steiner
BY
Attorneys

United States Patent Office 2,718,829
Patented Sept. 27, 1955

2,718,829

PROTECTIVE SURFACE

Raymond B. Seymour and Robert H. Steiner, Allentown, Pa., assignors to The Atlas Mineral Products Company of Pennsylvania, Mertztown, Pa., a corporation of Pennsylvania Application October 11, 1952, Serial No. 314,308

4 Claims. (Cl. 94—6)

This invention relates to a protective surface and, more particularly, relates to such a surface having particular utility when used in connection with steel, Portland cement, and other materials which react with an acid.

Due to very high resistance to the corrosive action of acid, alkali, and the like, resins based on polymers of furfuryl alcohol have been widely used, for example, in dairies, creameries, breweries, canneries and other food plants in which strong detergents, steam and acids are normally used to promote cleanliness. It is frequently desired to utilize such resins where they will come in contact with Portland cement, steel, or other construction materials which react with acids. Since these resins are catalyzed with an acid, their use with such construction materials results in the destruction of the chosen catalyst and prevents the formation of a hard cement. The result is poor adhesion and an invitation to structural failure.

The problem is solved by this invention through interpositioning of a layer of a polyester resin between the said construction material and the polymer of furfuryl alcohol. This results in a surprisingly strong bonding of the polyfurfuryl alcohol resin to the aforementioned building materials and entirely eliminates any weakness in the polyfurfuryl alcohol cement resin. Since the polyester resin, which is not highly resistant to certain chemicals, for example, to caustic or ketone solvents, is fully covered by the polyfurfuryl alcohol resin, the structure has a high resistance to corrosion and can, therefore, be used in food plants where detergents of high alkalinity are utilized for cleaning and floor structures are subjected to acids. The term "polfurfuryl alcohol" as used in the description and in the claims is meant to embrace all polymeric resins formed from furfuryl alcohol such as, for example, polymers of furfuryl alcohol, the reaction product of furfuryl alcohol and furfural, the reaction product of furfural and ketones, such as acetone, the reaction product of furfuryl alcohol and formaldehyde, or blends of these materials. These resins are well known to the art and, therefore, no other details need be given.

Any polyester resin can be used, that is, any resin having a substantially 100% polymerizable mix of a liquid dihydric alcohol ester of an ethylene alpha-beta-dicarboxylic acid and a liquid monomeric unsaturated polymerizable compound in which the unsaturation is due to a single terminal ethylenic group which is attached to a negative radical in which the ester aforesaid is soluble and with which it is copolymerizable in the presence of a peroxy polymerization catalyst. Reference may be had to "Modern Plastics Encyclopedia," published by Plastics Catalogue Corp., 122 E. 42nd Street, New York 17, N. Y., for typical polyester resins and the manner of their production. Thus, a composition comprising a substantially linear polyhydric alcohol ester of an unsaturated polybasic acid material of the maleic type and a substituted-ethylene body of resins, forming characteristics which are copolymerizible and miscible with the polyhydric alcohol ester. Thus, for example, the composition may be diethylene glycol maleate or diethylene glycol fumarate having incorporated therewith vinyl acetate, amylacrylate, or styrene. The curing of such a maleic substituted ethylene composition will be accelerated by using a curing catalyst such as benzoyl peroxide, phthalyl peroxide or air blown dioxane. Such thermosetting resins are well known in the art and reference may be made to Patent No. 2,255,313, issued September 9, 1941, to Carleton Ellis for further information relative to them. Reference may also be had to British Patents Nos. 540,168 and 540,169 for other exemplary polyester resins. A promoter such as N-ethyl aniline or tetraethylene pentamine may be used. Such promoters are well known as will be seen by reference to, for example, U. S. Patents 2,578,690, 2,449,299, and 2,452,669. Metal salts of organic acids such as cobalt driers may also be used with these resins as promoters.

The polyfurfuryl alcohol resin and the polyester resin will both preferably be mixed with an inert filler such as carbon, silica, asbestos or barytes. The polyester resins will be cured with a catalyst, such as benzoyl peroxide, while the polyfurfuryl alcohol resin will be cured by the addition of a suitable acid catalyst having an ionization constant not less than $1.38 \times 10^{-4}$ at 25° C., as for example, maleic acid, fumaric acid, paratoluene sulfonic acid, sulfamic acid, etc.

The protective surface can be applied in various manners such, for example, as coating the polyester resins over steel, setting bricks in the polyester resins and filling the spaces between the bricks with the polyfurfuryl alcohol resin. Again, the polyester resin may be laid, for example, over cement and a coating of polyfurfuryl alcohol resin laid over the polyester resin layer. In the latter case, it may be desired to strengthen the protective layer by embedding in the polyester resin a reinforcing structure which may take the form of, for example, woven glass fibers.

An alkaline-setting resin can be substituted for the polyester resin. Epoxy resins, for example, are very satisfactory. Thus bisphenol-epichlorhydrin and bisphenol-glycerol reaction products are satisfactory in lieu of a polyester resin. Such resins are well known as seen, for example, in "Modern Plastics" November 1950, page 113, The invention will be further clarified by a reading of the following description in conjunction with the drawings, in which.

Figure 1:
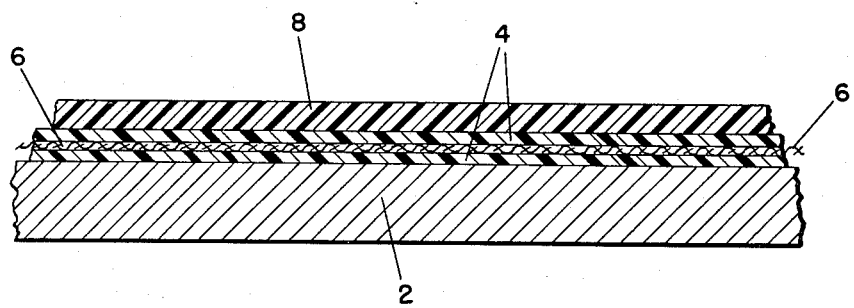
Figure 1 is a vertical section, partially broken away, through flooring having a protective layer in accordance with this invention.

As shown in Figure 1 a steel floor 2 is overlaid with a layer of a polyester resin 4, which is reinforced by a sheet of woven fabric 6. A layer 8 of polyfurfuryl alcohol resin is adhered to the top surface of layer 4.

Figure 2:
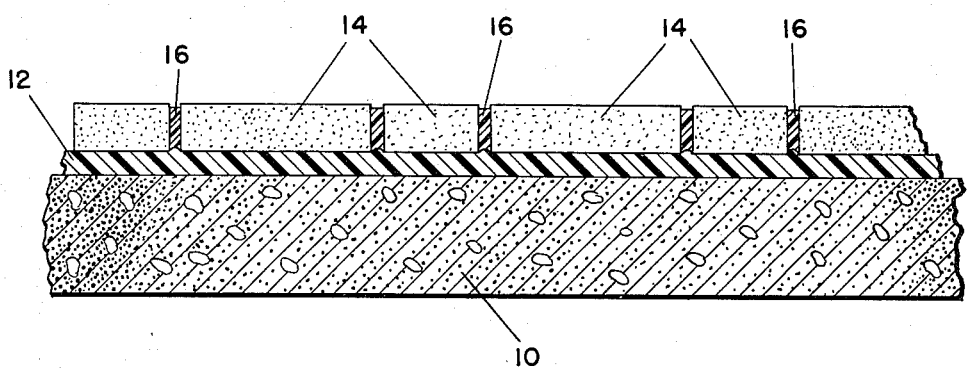
Figure 2 is a vertical section, partly broken away, through flooring having a modified protective layer in accordance with this invention.

As shown in Figure 2 a cement floor 10 is overlaid with a layer 12 of a polyester resin. Bricks 14 are embedded in the polyester resin layer. A filler 16 of polyfurfuryl alcohol resin fills the spaces between the bricks.

The following specific examples will further clarify the invention and be illustrative of its utility: Except where otherwise specified, all parts are by weight:

*Example 1*

A concrete tank was coated with a cement made by mixing 2 parts by weight of silica with approximately 1 part by weight of the reaction product of equal parts of diethylene glycol and fumaric acid modified with 30% by weight of monomeric styrene. 0.4 part of benzoyl peroxide and 0.04 part of N-ethyl aniline had previously been added to the silica. Immediately after the application of the filled polyester resin and while the product was still in a plastic state, 1⅜" thick tile was embedded in the plastic surface so that considerable plastic exuded into the vertical joints in order to hold the tile in place. After one hour at 70° F. the plastic had become hard and then the surface was covered with a filled cement made by adding approximately 2 parts by weight of carbon containing 2% of paratoluene sulfonic acid and this was mixed with approximately 1 part by weight of furfuryl alcohol-formaldehyde resin (110 C. P. S.). Another layer of tile was set over the previous tile with its sides buttered with the polyfurfuryl cement and its underside embedded in the plastic polyfurfuryl alcohol cement previously applied.

After 3 days, the structure was completely hard and stable and could be used to hold a reaction mixture which at times contained hot sodium hydroxide solution and at other times contained boiling 50% sulfuric acid.

*Example 2*

A steel vessel was sandblasted and to the sandblasted surface was applied a mixture of 1 part of diethylene glycol maleate (50% by weight)-vinyl acetate (50% by weight) copolymer, 0.5 part phthalyl peroxide and 0.04 part tetraethylene pentamine. While this was still in the plastic state, a woven open structure glass fabric was embedded in this cement. After the cement had hardened, approximately ⅛" thick, a polyfurfuryl alcohol mortar cement was troweled over the entire surface. After 4 days, the tank was used to hold a mixture of acids and ketone solvents. It is obvious that the polyester cement would not have been able to withhold the materials and very few other linings are available to handle a corrosive mixture of this type.

*Example 3*

On a concrete floor surface was troweled a ⅛" bed of 1 part diethylene glycol fumarate (70% by weight) styrene (30% by weight) copolymer 0.4 part benzoyl peroxide and 0.04 part N-ethyl aniline and while this was still in the plastic state, quarry tile measuring 6" x 6" x ¾" deep were embedded in the cement. After 90 minutes, it was impossible to release the tile and then a mixture of approximately 3 parts by weight of carbon flour containing 4% paratoluene sulfonic acid was mixed with approximately 2 parts by weight of liquid furfuryl alcohol-furfural resin (100 C. P. S.) and this cement was troweled into the existing joints. After 2 days, this floor was placed in service consisting of milk and milk acids, phosphoric acid for the removal of milkstone, lye used for cleaning and steam. A similar floor in which the underlay was composed of Portland cement failed within three weeks, whereas these conditions had no effect on the floor described in this example.

*Example 4*

On a concrete floor surface was troweled a ⅛" bed of 1 part propylene glycol maleate (85% by weight)-amylacrylate (15% by weight) copolymer, 0.3 part benzoyl peroxide and 0.04 part tetraethylene pentamine and while this was still in the plastic state, quarry tile measuring 6" x 6" x ¾" deep were embedded in the cement. After 90 minutes, it was impossible to release the tile and then a mixture of approximately 3 parts by weight of silica containing 3% paratoluene sulfonyl chloride was mixed with approximately 2 parts by weight of an equal mixture of phenol formaldehyde resin and furfuryl alcohol-furfural resin (100 C. P. S.) and this cement was troweled into the existing joints. After two days, this floor was placed in service consisting of milk and milk acids, phosphoric acid for the removal of milkstone, lye used for cleaning and steam. A similar floor in which the underlay was composed of Portland cement failed within 3 weeks, whereas these conditions had no effect on the floor described in this example.

*Example 5*

A coating cement was made by mixing 1 part by weight of silica with 1 part by weight of the reaction product of bisphenol (50% by weight) and epichlorhydrin (50% by weight) and 0.03 part by weight of diethylene triamine. Immediately after the application of the filled resin and while the product was still in a plastic state, 1⅜" thick tile was embedded in the plastic surface so that considerable plastic exuded into the vertical joints in order to hold the tile in place. After one hour at 70° F. the plastic had become hard and then the surface was covered with a filled cement made by adding approximately 2 parts by weight of carbon containing 2% of paratoluene sulfonic acid and this was mixed with approximately 1 part by weight of furfuryl alcohol-formaldehyde resin (110 C. P. S.). Another layer of tile was set over the previous tile with its sides buttered with the polyfurfuryl cement and its underside embedded in the plastic polyfurfuryl alcohol cement previously applied.

*Example 6*

On a concrete floor surface was troweled a ⅛" bed of 1 part of 70% by weight of carbon flour and 30% by weight of the reaction product of bisphenol (50% by weight) and glycerol (50% by weight) and 0.02 part by weight of tetraethylene pentamine and while this was still in the plastic state, quarry tile measuring 6" x 6" x ¾" deep were embedded in the cement. After 90 minutes a mixture of approximately 3 parts by weight of carbon flour containing 4% paratoluene sulfonic acid was mixed with approximately 2 parts by weight of liquid furfuryl alcohol-furfural resin (100 C. P. S.) and this cement was troweled into the existing joints.

It is not desired to be limited except as set forth in the following claims, the above description being by way of illustration only.

What is claimed is:

1. An acid and alkali resistant structure comprising a Portland cement supporting structure, a resin layer adhered to said supporting structure, said resin layer being selected from the group consisting of bisphenol-epichlorhydrin, bisphenol-glycerol and a liquid polyhydric alcohol ester of an unsaturated polybasic acid modified with a liquid monomeric unsaturated polymerizable hydrocarbon; and a second resin layer selected from the group consisting of polyfurfuryl alcohol, furfuryl alcohol-furfural, furfuryl alcohol-formaldehyde and furfural-ketone resins overlying and adhered to said first mentioned resin layer.

2. An acid and alkali resistant structure comprising a Portland cement supporting structure, a resin layer adhered to said supporting structure, said resin layer being selected from the group consisting of bisphenol-epichlorhydrin, bisphenol-glycerol and a liquid polyhydric alcohol ester of an unsaturated polybasic acid modified with a liquid monomeric unsaturated polymerizable hydrocarbon; molded clay blocks set in said resin layer in spaced apart relationship, and a resin selected from the group consisting of polyfurfuryl alcohol, furfuryl alcohol-furfural, furfuryl alcohol-formaldehyde and furfural-ketone resins in the spaces between said molded clay blocks and adhered to said resin layer and to said blocks.

3. An acid and alkali resistant structure comprising a Portland cement supporting structure, a resin layer adhered to said supporting structure, said resin layer being the reaction product of a liquid dihydric alcohol and an ethylene alpha-beta-dicarboxylic acid modified with styrene; and a second resin layer selected from the group consisting of polyfurfuryl alcohol, furfuryl alcohol-furfural, furfuryl alcohol-formaldehyde and furfural-ketone resins overlying and adhered to said first mentioned resin layer.

4. An acid and alkali resistant structure comprising a Portland cement supporting structure, a resin layer adhered to said supporting structure, said resin layer being the reaction product of a liquid dihydric alcohol and an ethylene alpha-beta-dicarboxylic acid modified with styrene; molded clay blocks set in said resin layer in spaced apart relationship, and a resin selected from the group consisting of polyfurfuryl alcohol, furfuryl alcohol-furfural, furfuryl alcohol-formaldehyde and furfural-ketone resins in the spaces between said molded clay blocks and adhered to said resin layer and to said blocks.

References Cited in the file of this patent

UNITED STATES PATENTS

| | | | |
|---|---|---|---|
| Re. 19,518 | Chaffee | Apr. 9, | 1935 |
| 2,229,742 | Kauffman | Jan. 28, | 1941 |
| 2,433,357 | Fuller | Dec. 13, | 1947 |
| 2,626,223 | Sattler et al. | Jan. 20, | 1953 |

FOREIGN PATENTS

| | | | |
|---|---|---|---|
| 303,936 | Great Britain | Jan. 17, | 1929 |
| 476,914 | Canada | Sept. 11, | 1951 |